July 25, 1933.  C. H. SEAHOLM  1,919,753

SOUND ON FILM APPARATUS

Filed March 2, 1932

Inventor
Charles Hugo Seaholm
By David Pelton Moore
Attorney

Patented July 25, 1933

1,919,753

UNITED STATES PATENT OFFICE

CHARLES HUGO SEAHOLM, OF NEW YORK, N. Y., ASSIGNOR TO GENERAL TALKING PICTURES CORPORATION, OF NEW YORK, N. Y., A CORPORATION OF DELAWARE

SOUND ON FILM APPARATUS

Application filed March 2, 1932. Serial No. 596,333.

The present invention relates to improvements in sound-on-film apparatus, this particular application being a division of my application for talking motion picture apparatus filed November 8th, 1929 Serial No. 405743, one object of the invention being the provision of a novel form of sound head and a particular construction of excitor lamp mount.

Another object of the present invention is the provision of a sound head in which a plural number of exciting lamps are so mounted with relation to the optical system and the photo electric cell and at the opposite end of the sound head to the photo electric cell, so that one lamp at a time may be in operative relation but in such a position as to enable the operator to replace said lamp should the necessity arise by transverse shifting thereof to dispose a second lamp in operative relation to the optical system and permit the removal of the defective lamp.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
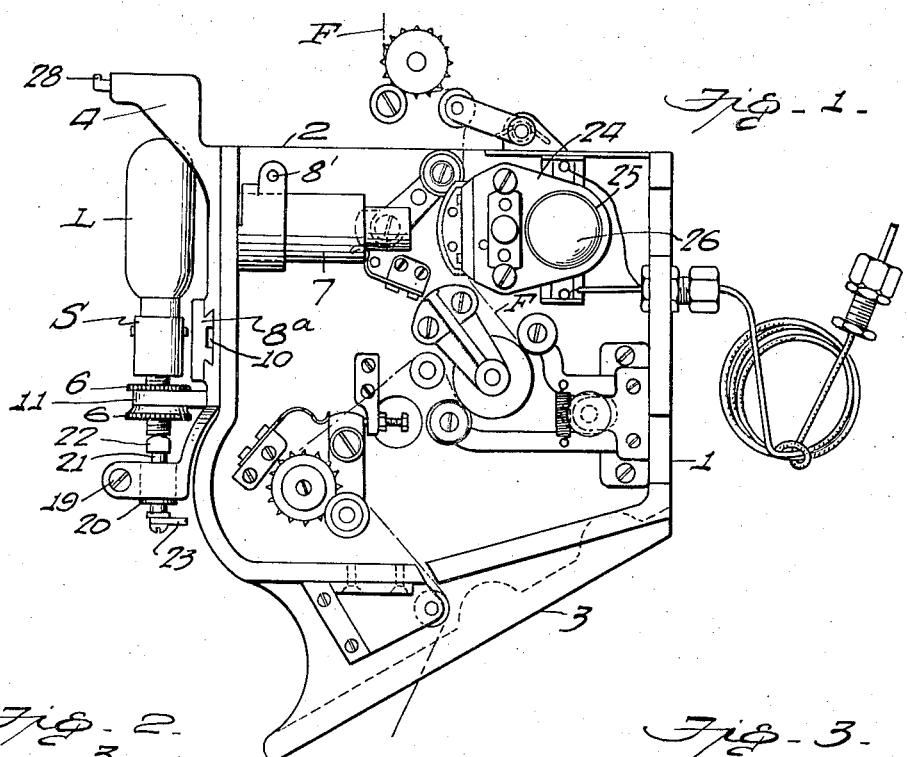
Figures 2, 3:
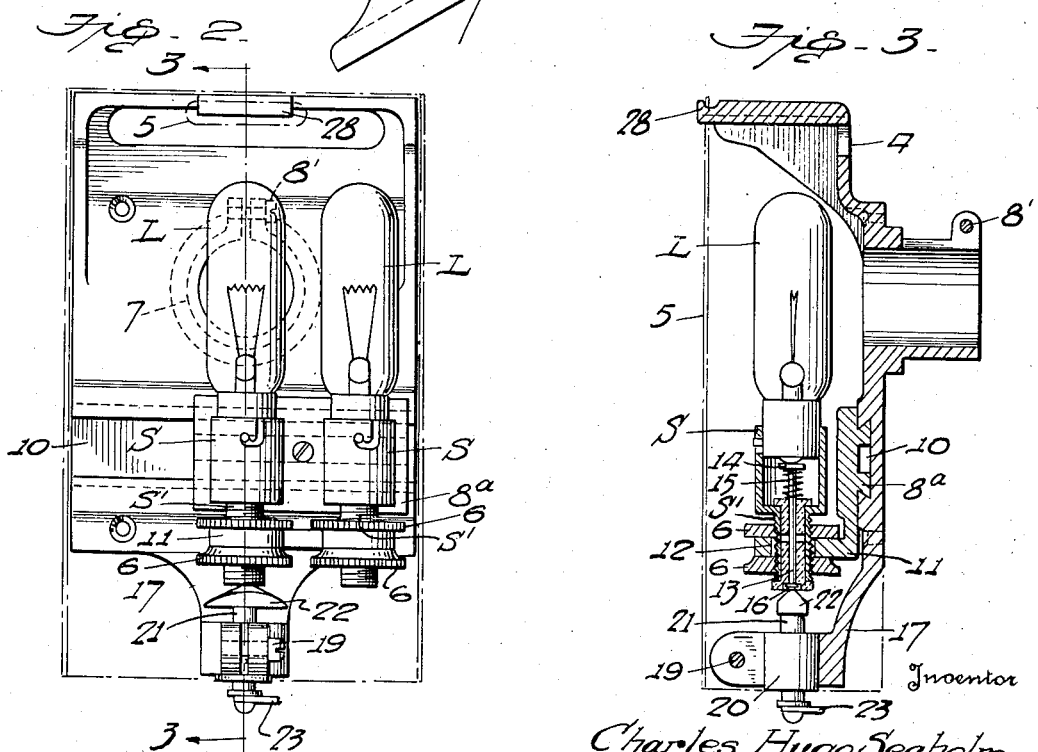

In the accompanying drawing, Figure 1 is a longitudinal sectional view through the complete sound head. Figure 2 is a plan view thereof taken from the excitor lamp end, showing the position of the two lamps under normal arrangement. Figure 3 is a cross section taken on line 3—3 of Figure 2.

In the present practical embodiment of combined picture and sound projecting machines it is usual to maintain a picture projector and talking motion picture attachment or what is known as the sound box or head, as two separate units mechanically connected together, the sound box unit being preferably located below the gear and lens box of the former. Naturally in such a device there are numerous sprocket wheels and rollers over which the film F passes and hence in threading up the machine it is necessary to make provision in the apparatus to permit of ease and rapidity in threading the machine without danger to the film. It is also desirable to provide a talking motion picture attachment for standard projection machines since in most cases the projection machine is already in operation and it is, therefore, highly desirable to be able to add as a unit the talking motion picture or sound box attachment thereto.

The casing supporting all of the parts of the attachment is shown at 1, and such casing is so shaped and designed as to rest upon and be attached to the base of the motion picture projector, and have attached thereto and support the head of such projector. The upper edge indicated at 2 of this casing is made in such form of configuration so as to permit of the uniting of the attachment casing with the head of the picture projector. The edge indicated by the reference numeral 3 is of such configuration as to permit of the attachment thereto of the base and lower reel magazine which receives the film.

At 4 is a small casing secured to the casing 1 in which the two excitor lamps L are mounted in their sockets S. Each socket is controlled by means of the threaded rod or sleeve S' and a nut 6 to permit of its fine adjustment vertically. By means of the use of the two sockets S mounted as indicated, the operator without any interruption to service can move slide 8a to move one lamp L out of alinement with the optical system 7, and bring the other lamp into alinement, this being necessary when one lamp burns out. The burned out lamp can thus be removed and a new one substituted, all of this being possible while the machine is being operated. 5 is a pivoted mounting for the sockets. Forming part of or secured to the casing 4 is a round cylindrical projection 8 which is slotted and provided with ears and a screw 8' so that the optical system tube 7 may be adjustably secured therein for longitudinal attachment. The lens system of any of the well known types in this art are supported within the tube 7 and are adjustable or fixed with respect to each other as may be desirable to permit of focusing the light from one of the excitor lamps on to the film at the point where the sound record is impressed.

At the rear of the casing 1 is provided a dovetailed recess 10 in which the dovetail in cross section slide 8a is mounted for transverse sliding movement and carried by this slide 8a is a right angled member 11 provided with two apertures 12 for the introduction of the threaded rod or sleeve S' and the respective lamp socket S. Mounted for vertical sliding movement within the nuts 6 is a stem or rod 13 having a lamp contact engaging button 14 at one end so that the spring 15 will movably hold the button in the position as shown in Figure 3, a headed contact button 16 being upon the opposite end of the stem and acting as a limiting means and in opposition to the spring 15.

A depending arm or member 17 is carried by the slide 8a and in turn is provided with a clamping sleeve 18 having a screw 19 and mounted within the same is a casing 20 in which is mounted a spring urged stem 21 having a winged contact button 22 the central point of which is normally in the path to engage the button 16 to form a perfect electrical contact therewith and yet at the same time not too greatly oppose the movement of the slide 8a from the position as shown in Figure 2 to place the lamp at the extreme right thereof in the central position and in engagement with the button 22. Connected to the lower end of the stem 21 is an electrical conducting wire 23 by means of which current is properly conducted to the filament of the lamp when in proper assembled position. Mounted within the casing 1 is a slit block unit 24 over which the film F is passed and at which point the slit image from the lamp is projected upon the film while disposed within the cylindrical opening 25 of the slit block unit is a photoelectrical cell 26 which in turn receives the light from the exciter lamp to have its resistance varied in accordance with the sound photographically impressed upon the film.

From the foregoing description it is evident that when either one of the lamps L is burned out or defective, that by merely pushing the slide 8a to the left as viewed in Figure 2, the second normal lamp may be brought into play and use without halting the operation of the complete machine, and that the burned out lamp may be readily removed by turning it in the socket S and a new lamp substituted. In this manner there is always provided the "spare" for use in this type of motion picture projector.

The rear of the compartment formed by the overhanging portion 28 at the rear of the casing 1 is normally sealed, by the pivoted mounting or door 5 and therefore constitutes with said door a closed casing for the exciter lamps so that the light therefrom is confined therewithin.

What is claimed is:

1. In apparatus of the character disclosed, the combination of an optical system, an exciter lamp at one end of the same and a photoelectric cell at the opposite end, a socket for said exciter lamp and a trackway for mounting said socket in transversely movable relation at the end of the optical system, enabling the replacement of one lamp for another by the transverse shifting of a lamp carrying socket in the trackway aforesaid.

2. In apparatus of the character disclosed, the combination of an optical system, an exciter lamp at one end of the same and a photoelectric cell at the opposite end, a socket for said exciter lamp, a trackway for mounting said socket in transversely movable relation at the end of the optical system, enabling the replacement of one lamp for another by the transverse shifting of a lamp carrying socket in the trackway aforesaid, a current conducting lamp-engaging contact on the socket and current conducting contacts on the socket and trackway cooperating in the position of alinement of the lamp with the optical axis.

3. In apparatus of the character disclosed, the combination of an optical system, an exciter lamp at one end of the same and a photoelectric cell at the opposite end, a socket for said exciter lamp and a trackway for mounting said socket in transversely movable relation at the end of the optical system, enabling the replacement of one lamp for another by the transverse shifting of a lamp carrying socket in the trackway aforesaid, said trackway being of sufficient transverse extent to support a number of lamp sockets alined in readiness, one to be shifted in place of the other.

4. In apparatus of the character disclosed, the combination of a lens tube, a lamp holder, an exciter lamp, universally adjustable in said holder and having means cooperating with the holder for releasably retaining said lamp in its universally adjusted relation in the holder and means for supporting and retaining said holder in predetermined definite relation to the lens tube.

5. In apparatus of the character disclosed, the combination of an exciter lamp, a holder for said lamp, said lamp having a universally adjustable mounting in said holder and cooperating means on the lamp and holder for releasably retaining the lamp in universally adjusted relation in the holder and a support having means for positioning and retaining the holder in predetermined relation.

CHARLES HUGO SEAHOLM.

CERTIFICATE OF CORRECTION.

Patent No. 1,919,753.  July 25, 1933.

CHARLES HUGO SEAHOLM.

It is hereby certified that error appears in the heading to the printed specification of the above numbered patent requiring correction as follows: Line 4, application clause, strike out the word "Application" and insert instead "Original application filed November 8, 1929 Serial No. 405,703. Divided and this application"; and that the said Letters Patent should be read with this correction therein that the same may conform to the record of the case in the Patent Office.

Signed and sealed this 24th day of October, A. D. 1933.

F. M. Hopkins (Seal)  Acting Commissioner of Patents.